United States Patent [19]
Tokiwa

[11] Patent Number: 5,148,907
[45] Date of Patent: Sep. 22, 1992

[54] CUT SECTIONS CONVEYING DEVICE FOR A CUTTING MACHINE

[75] Inventor: Toru Tokiwa, Hadano, Japan
[73] Assignee: Amada Company, Limited, Japan
[21] Appl. No.: 623,424
[22] PCT Filed: May 18, 1990
[86] PCT No.: PCT/JP90/00638
  § 371 Date: Dec. 17, 1990
  § 102(e) Date: Dec. 17, 1990
[87] PCT Pub. No.: WO90/14191
  PCT Pub. Date: Nov. 29, 1990

[30] Foreign Application Priority Data
  May 19, 1989 [JP] Japan .................. 1-124535
  Jun. 28, 1989 [JP] Japan .................. 1-074880[U]
  Jul. 14, 1989 [JP] Japan .................. 1-182065

[51] Int. Cl.⁵ ........................... B65G 47/34
[52] U.S. Cl. ................... 198/468.2; 198/364; 198/468.01; 83/277
[58] Field of Search ........ 198/468.01, 468.2, 468.6, 198/468.1, 468.7, 364, 372; 83/277, 435.1

[56] References Cited

U.S. PATENT DOCUMENTS

| | | | |
|---|---|---|---|
| 3,417,854 | 12/1968 | Bilocq | 198/364 |
| 4,048,833 | 9/1977 | Lorenz | 83/277 X |
| 4,068,695 | 1/1978 | Seaman | 198/468.6 X |
| 4,080,858 | 3/1978 | Stolzer | 83/277 X |
| 4,147,259 | 4/1979 | Nilsson | 198/468.2 X |
| 4,628,781 | 12/1986 | Rowley | 198/468.2 X |
| 4,697,487 | 10/1987 | Lameron | 83/435.1 X |
| 4,765,215 | 8/1988 | Spath | 83/153 |
| 4,781,092 | 11/1988 | Gaiser | 83/153 |

FOREIGN PATENT DOCUMENTS

| | | |
|---|---|---|
| 3633691 | 7/1987 | Fed. Rep. of Germany. |
| 57-195024 | 11/1982 | Japan. |
| 2018673 | 10/1979 | United Kingdom. |
| 2194916 | 3/1988 | United Kingdom. |

Primary Examiner—Robert P. Olszewski
Assistant Examiner—James R. Bidwell
Attorney, Agent, or Firm—Wigman & Cohen

[57] ABSTRACT

A cut section conveying device is provided for a cutting machine which includes: a conveyor frame positioned at the front side of the cutting machine; a carriage supported on the conveyor frame in a freely reciprocating manner in the longitudinal direction, approaching and withdrawing relative to the cutting position of the cutting machine; a movable vise body supported on the carriage in a manner allowing free movement in the lateral direction; a first clamp jaw and a second clamp jaw provided on the movable vise body for clamping the cut section; a reciprocating action device for moving the movable vise body in a reciprocating manner in the lateral direction relative to the carriage; and a lifting device for lifting up the clamp jaws so that the lower ends of the clamp jaws are raised to a position higher than a height of the cut section. In addition, the clamp jaws for clamping the cut section can be freely inserted into a space between a support table, which supports the cut section in the cutting position, and the cut section.

8 Claims, 13 Drawing Sheets

CUT SECTIONS CONVEYING DEVICE FOR A CUTTING MACHINE

BACKGROUND OF THE INVENTION

1. Field of the Invention

The present invention relates to a device which conveys cut sections which have been cut from a workpiece by a cutting machine such as a sawing machine or the like and, in particular, to a conveying device which can convey a cut section to the left or the right side of the conveyor route.

2. Description of the Prior Art

Examples of commonly known machines for cutting an elongated material such as, for example, a rod and the like, are a circular sawing machine and a band sawing machine, and the like. In this type of cutting machine, a main vise device installed on the cutting machine for securely holding a workpiece to be cut by a saw blade is provided close to the cutting position of the cutting machine. A feeding vise device for feeding a workpiece to the cutting position is usually provided on the rear side of the main vise device in a manner allowing free reciprocal movement in the front and rear directions.

In a cutting machine with the above configuration, the workpiece can be automatically fed to the cutting position of the cutting machine by the automatic motion of the feeding vise device in the front and rear directions.

To make the cutting machine fully automatic, it is further necessary to automatically convey sections cut from the workpiece by the cutting machine at the cutting position to the subsequent process. A device by which the cut sections can be automatically conveyed from the cutting position of the cutting machine has been disclosed in U.S. Pat. No. 4,765,215 (hereinafter referred to as the first prior art). In the first prior art, a vise device which conveys the workpiece to the downstream side of the cutting machine (i.e. to the front of the cutting machine) is provided free to move in the longitudinal direction of the cutting machine. In the first prior art, the cut section which is cut at the cutting position of the cutting machine is clamped in vise jaws of the vise device. Then, after conveying the cut section forward, one of the vise jaws is pivoted in the upper direction and the other vise jaw pushes the cut section to one side of the conveyor route.

Another art wherein the workpiece is pushed in the direction lateral to the conveyor route is disclosed in Japanese Laid Open Patent No. Sho-57-195024 (hereinafter referred to as the second prior art). In the second prior art, the workpiece conveyed on the conveyor is pushed to a side by a hydraulic cylinder which is provided on one side of the conveyor.

However, in all of the prior art, just after the workpiece is pushed to one side of the conveyor route, the pusher device for pushing the workpiece is positioned on the conveyor route. Thus it is impossible to convey the next workpiece to the conveyor route until the pusher device is returned to its home position in the lateral direction. A problem therefore exists in that improved operating efficiency is necessary.

In addition, the workpiece can only be pushed to one side. The problem therefore exists in that the other side of the conveyor route cannot be utilized.

SUMMARY OF THE INVENTION

A first object of the present invention is to provide, with due consideration to the drawbacks of such conventional devices, a cut section conveying device which can laterally convey a cut section, which is transported from the cutting position of the cutting machine, to either side of the conveyor route, optionally.

The first object is achieved in the present invention by the provision of a cut section conveying device for a cutting machine comprising: a conveyor frame positioned at the front side of the cutting machine; a carriage supported on the conveyor frame in a freely reciprocating manner in the longitudinal direction, approaching and withdrawing relative to the cutting position of the cutting machine; a movable vise body supported on the carriage in a manner allowing free movement in the lateral direction; a first clamp jaw and a second clamp jaw provided on the movable vise body for clamping the cut section; a reciprocating action device for moving the movable vise body in a reciprocating manner in the lateral direction relative to the carriage; and means for lifting up the clamp jaws so that the lower ends of the clamp jaws are raised to a position higher than a height of the cut section.

With this structure, when the carriage approaches the cutting machine, the section cut from the workpiece at the cutting position of the cutting machine can be clamped by the first and second clamp jaws. After the cut section is clamped by the first and second clamp jaws, the carriage can advance and convey the cut section forward. After the cut section is conveyed forward, movable vise body can be moved in the lateral direction by the reciprocating action device to move the cut section from the conveyor route in the lateral direction. During the lateral movement, the clamp jaw loosely clamp the cut section, if the weight of the cut section is heavy, and firmly clamp the cut section if the weight is light.

After the cut section is moved laterally from the conveyor route in this manner, the clamp jaws can be elevated to a height where the clamp jaws clear the cut section, so that there is no interference between the cut section and the clamp jaws.

After the cut section is moved from the conveyor route in the lateral direction in this manner, the next workpiece can be moved onto the conveyor route. The movable vise body can then be returned to its original position at the lateral center. That is to say, when the movable vise body is returned to its original position, even if the next cut section is positioned on the conveyor route, the clamp jaws can be moved sideways and then moved downward so that the cut section is positioned between the two clamp jaws. Then, the next cut section can be clamped, and conveyed forward and sideways in the same manner as outlined above.

A second object of the present invention is to provide a cut section conveying device by which the cut section can be reliably clamped, even when a short section is cut from a workpiece at the cutting position of the cutting machine, and even when the region at which the cut section is held by the clamp jaws of the conveying device is narrow.

The second object is achieved in the present invention by the provision of a cut section conveying device wherein the clamp jaws for clamping the cut section can be freely inserted into a space between a support table, which supports the cut section in the cutting position, and the cut section.

BRIEF DESCRIPTION OF THE DRAWINGS

These and other objects, features, and advantages of the present invention will become more apparent from the following description of the preferred embodiments taken in conjunction with the accompanying drawings, in which.

DETAILED DESCRIPTION OF THE PREFERRED EMBODIMENTS

Figure 1:
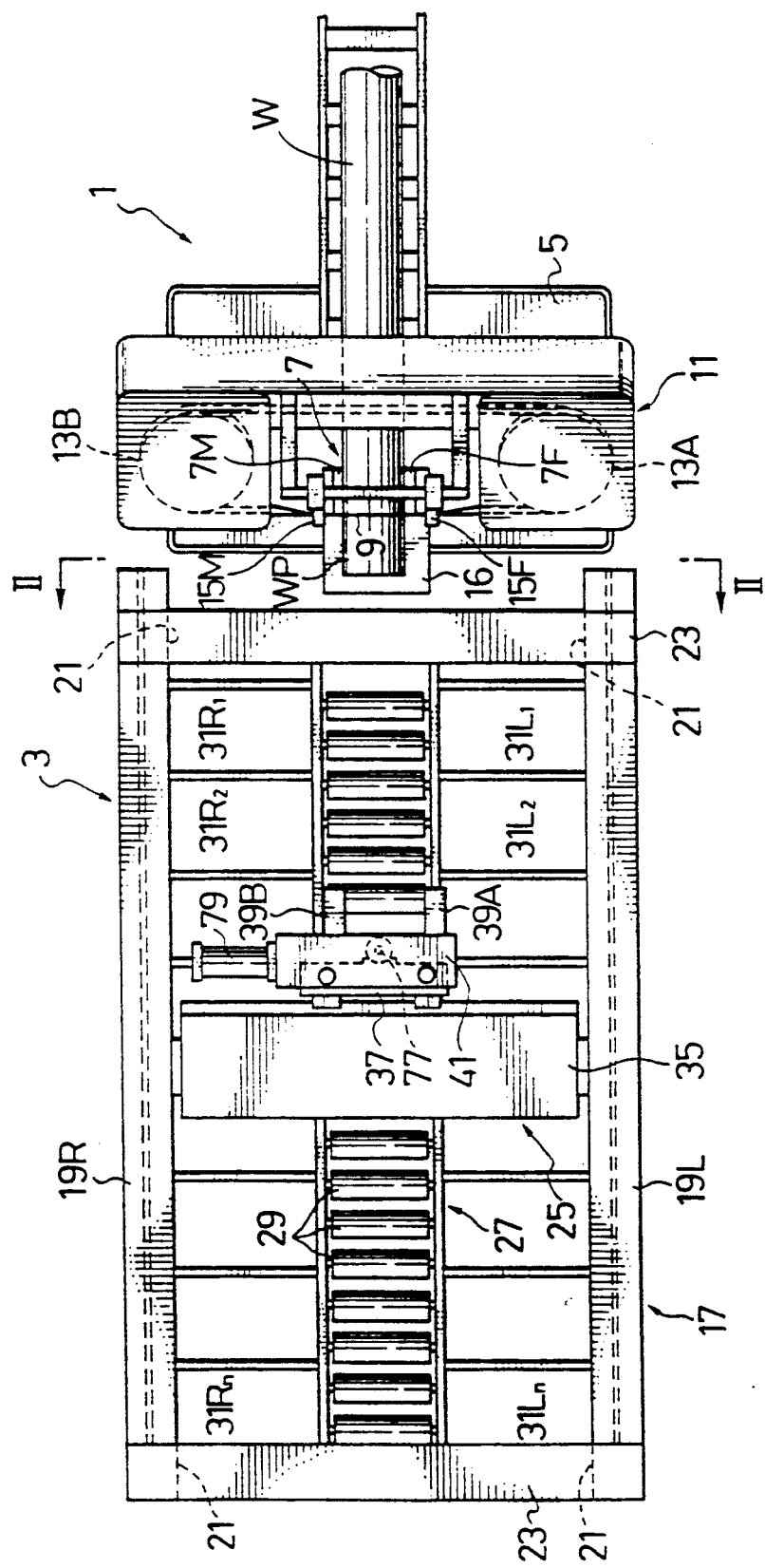
FIG. 1 is a schematic plan view indicating the positional relationship between a cutting machine and a first embodiment of the cut section conveying device of the present invention.

FIG. 1 is a schematic plan view indicating the positional relationship between a cutting machine 1 and an embodiment of a cut section conveyor device 3 of the present invention. As can be readily understood from FIG. 1, the cut section conveyor device 3 is positioned at the front of the cutting machine 1 (i.e. the left side in FIG. 1).

In this embodiment of the present invention a horizontal band saw is shown as an example of the cutting machine 1. The horizontal band saw 1 is mounted on a box-shaped base pedestal 5. A main vise device 7 comprising a fixed vise jaw 7F and a movable vise jaw 7M for interposedly securing an elongated workpiece W is provided on the top of the base pedestal 5. On the rear of the main vise device 7 (i.e. the right side in FIG. 1) a feeding vise device (omitted from the drawings) for feeding the workpiece W to the cutting machine 1 is provided in a manner allowing free forward and backward movement.

In addition, a saw housing 11 provided with a band saw blade 9 for cutting the workpiece W, which is interposedly secured at the cutting position by the main vise device 7, is provided in a manner allowing free vertical movement. The band saw housing 11 is provided with a drive wheel 13A and a driven wheel 13B which carry the band saw blade 9 in a freely rotatable manner. Also, a fixed saw blade guide 15F and a movable saw blade guide 15M which support and guide the saw blade 9 are provided, one on each side of the workpiece W, so that the saw blade 9 is maintained vertically with the tooth section oriented downward.

The fixed saw blade guide 15F and the movable saw blade guide 15M are preferably set as close as possible to the workpiece W to restrain any deviation in the cut by the saw blade 9.

In addition, a support table 16 is provided on the base pedestal 5 of the cutting machine 1 to support a section WP cut from the workpiece W at the cutting position.

The configuration of a horizontal band saw 1, shown as an example of the cutting machine, is commonly known. Therefore, any further detailed explanation of the structure and operation of the horizontal band saw will be omitted.

Figure 2:
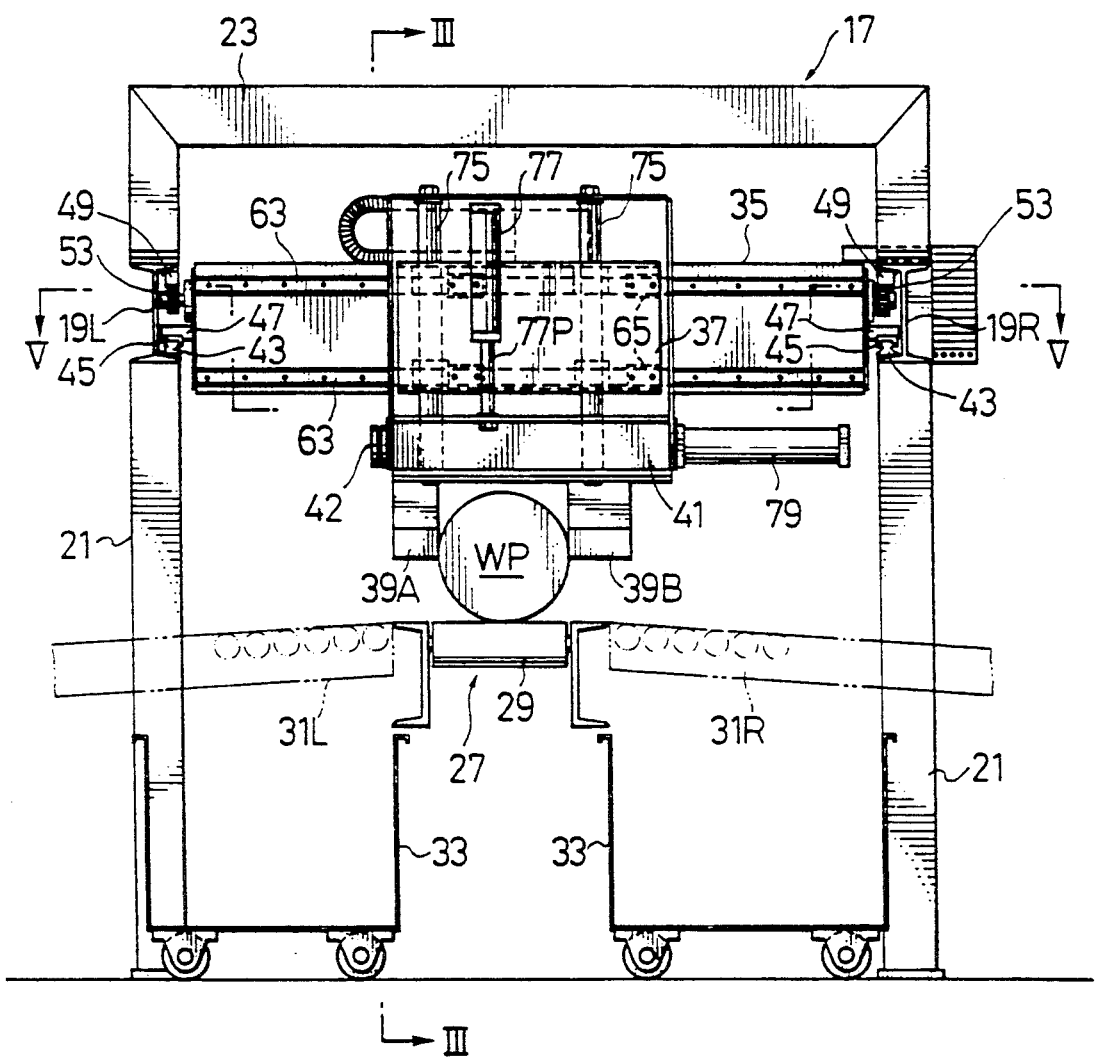
FIG. 2 is a sectional elevational view taken along the lines II—II in FIG. 1.
Figure 3:
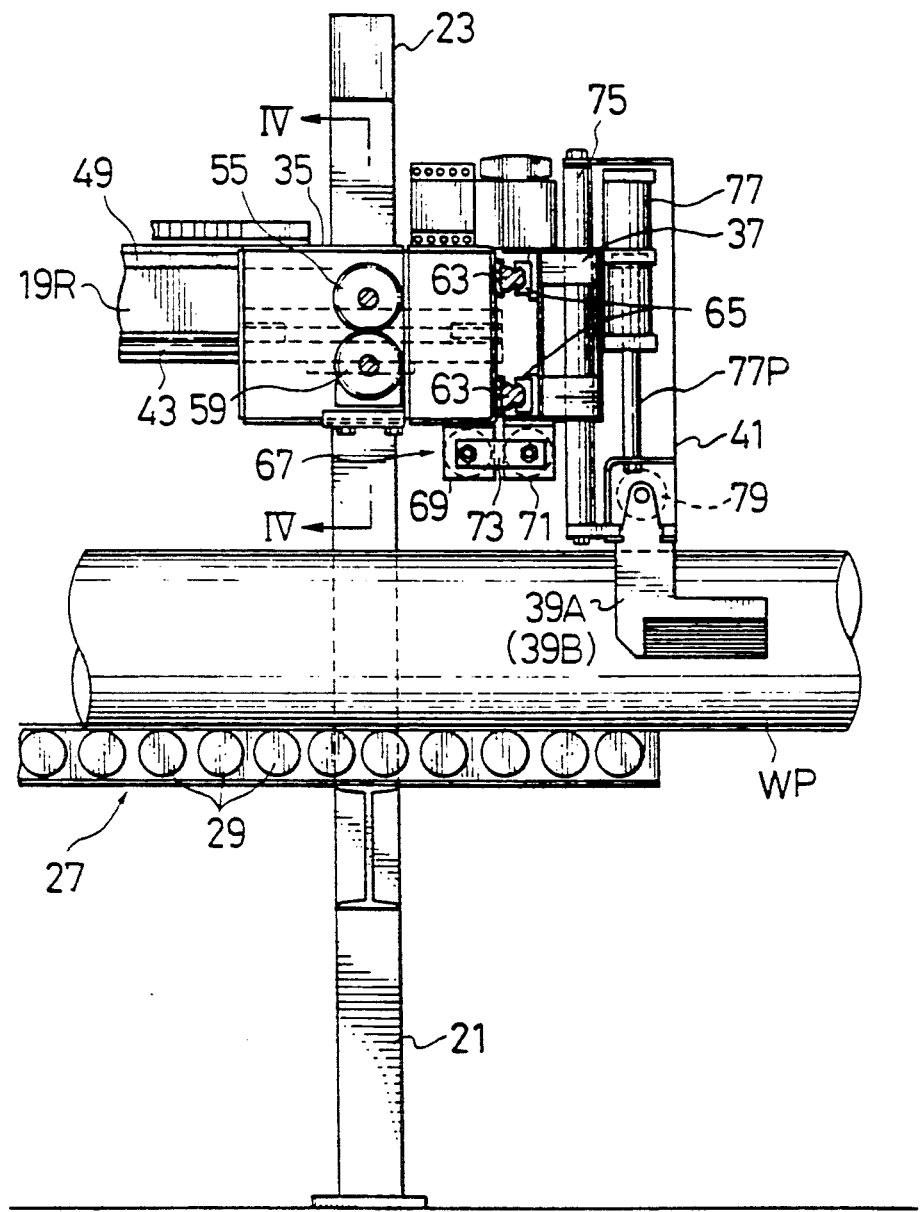
FIG. 3 is a sectional side elevational view taken along the lines III—III in FIG. 2.

Now referring to FIG. 1, FIG. 2, and FIG. 3, the cut section conveyor device 3 comprises a conveyor frame 17 provided in front of the cutting machine 1. The conveyor frame 17 has a frame structure comprising a plurality of supporting rods 21, which support a left beam member 19L and a right beam member 19R extending in the longitudinal direction of the frame 17, and a plurality of linking beam members 23, which join the left and right beam members 19L, 19R.

A moving part 25 of the conveyor device, which conveys the cut section WP forward after it is cut from the workpiece W at the cutting position of the cutting machine 1, is supported on the conveyor frame 17 free to move in the longitudinal direction. Also, a conveyor route means 27 is provided to support the cut section WP in a manner allowing free forward movement thereof by the moving part of the conveyor device 25.

The conveyor route means 27 comprises a plurality of support rollers 29 provided in a freely rotatable manner for supporting the cut section WP. A plurality of splitter members 31L1, 31L2, 31L3 . . . 31Ln and 31R1, 31R2, 31R3 . . . 31Rn are provided on the left and right sides of the conveyor route means 27 respectively. A plurality of buggies 33 (see FIG. 2), in which the cut sections WP are collected, are provided in a manner freely accessible for the splitter members 31L1, 31L2, 31L3 . . . 31Ln and 31R1, 31R2, 31R3 . . . 31Rn to allocate the cut sections WP. The moving part of the conveyor device 25 is provided with a first carriage 35 free to move in the longitudinal direction to convey the cut section WP forward from the cutting position of the cutting machine 1. A second carriage 37 is supported in a manner allowing free lateral reciprocating movement (in the vertical direction in FIG. 1) on the first carriage 35. Supported in a manner allowing free vertical movement on the second carriage 37 is a movable vise body 41 equipped with a first clamp jaw 39A and a second clamp jaw 39B for clamping the cut section WP positioned at the cutting position of the cutting machine 1.

Figure 4:
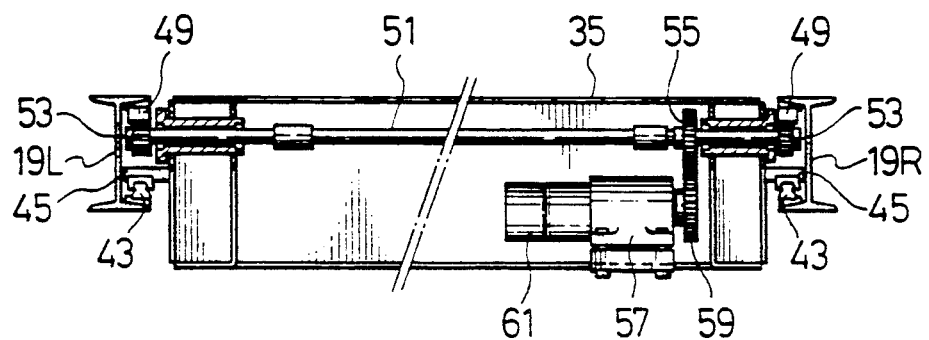
FIG. 4 is a sectional view taken along the lines IV—IV in FIG. 3.

Specifically, as can be clearly understood from FIG. 2 and FIG. 3, a guide rail 43 is provided on each of the right and left beam members 19R, 19L on the conveyor frame 17 extending in the longitudinal direction. One bracket 47 of a pair is integrally supported on each of a pair of right and left sliders 45 which freely slide on the guide rails 43. Referring to FIG. 4 as well as FIG. 2, one rack 49 of a pair provided on the beam members 19R, 19L parallel to the guide rails 43 is engaged by one of a pair of pinions 53 mounted at each end of a rotary shaft 51 which is supported in a freely rotatable manner on the first carriage 35. A driven gear 55 is mounted on the rotary shaft 51. A drive gear 59 mounted on a servo motor 57 carried on the first carriage 35 engages the driven gear 55.

It can be clearly understood that, because of this configuration, the first carriage 35 moves longitudinally, guided by the guide rails 43, driven by the servo motor 57. The first carriage 35 can be accurately positioned in the longitudinal direction by the provision of a detection device such as, for example, a pulse encoder 61 (shown in FIG. 4) or the like mounted on the servo motor 57 to provide accurate detection of the movement of the first carriage 35.

A guide rail 63 (see FIG. 3) is provided, extending in the lateral direction on the first carriage 35, for guiding the second carriage 37 in a reciprocating manner in the lateral direction. The second carriage 37 is supported on the guide rail 63 in a manner allowing free reciprocating movement through a plurality of sliders 65. A reciprocating movement device 67 is mounted between the first carriage 35 and the second carriage 37 to provide reciprocating movement of the second carriage 37 in the lateral direction with respect to the first carriage 35.

Figure 5:
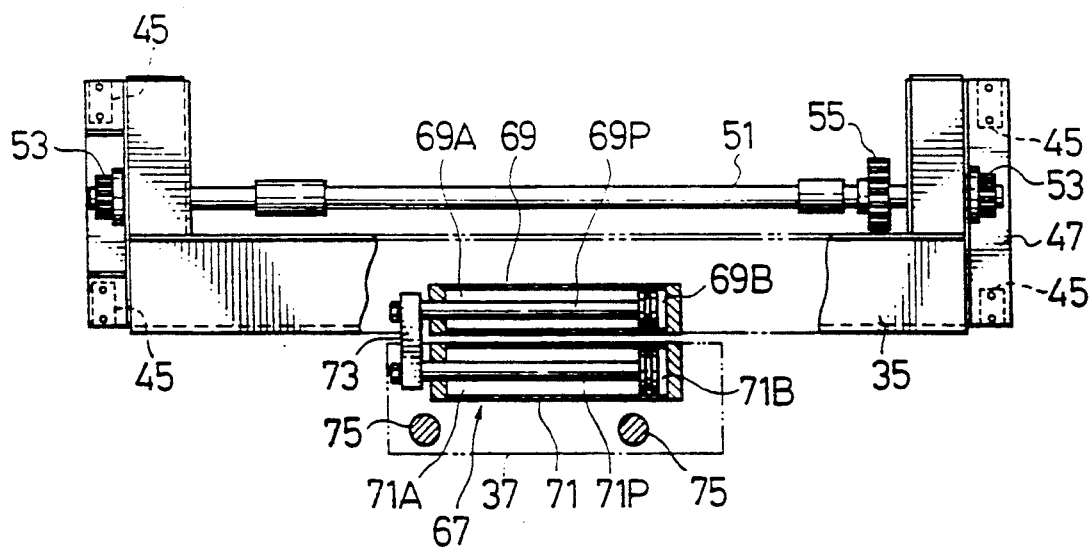
FIG. 5 is a sectional elevational view taken along the lines V—V in FIG. 2.

In this embodiment of the present invention, the reciprocating movement device 67, as shown in FIG. 5, comprises a first cylinder 69 mounted on the first carriage 35 and a second cylinder 71 mounted on the second carriage 37. A piston rod 69P provided in a freely reciprocating manner on the first cylinder 69 is integrally linked to a piston rod 71P provided in a freely reciprocating manner on the second cylinder 71 by a linking member 73.

Accordingly, as shown in FIG. 5, when the operating fluid is supplied to a hydraulic pressure chamber 69B of the first cylinder 69 in the state where hydraulic fluid is supplied to a hydraulic pressure chamber 71A of the second cylinder 71, the piston rod 71P is drawn into the second cylinder 71, the piston rod 69P is projected from the first cylinder 69, and the second carriage 37 moves from the center position shown in FIG. 5 to the left. Conversely, in the state where hydraulic fluid is supplied to a hydraulic pressure chamber 69A of the first cylinder 69 so that the piston rod 69P is drawn into the first cylinder 69, when the operating fluid is supplied to a hydraulic pressure chamber 71B of the second cylinder 71 so that the piston rod 71P is projected from the second cylinder 71, the second cylinder 37 moves from the center position to the right.

That is to say, in the state where hydraulic fluid is supplied to the hydraulic pressure chambers 69A, 71A of the first and second cylinders 69, 71 so that the piston rods 69P, 71P are drawn in, the second carriage 37 can be positioned to the center position; and the carriage 37 can be moved to the left or the right of the center position by suitably actuating one of the cylinders 69, 71.

The movable vise body 41, as shown in FIG. 2 and FIG. 3, is supported by a plurality of elevating bars 75 which are supported on the second carriage 37 in a manner allowing free movement vertically. A piston rod 77P is provided in a manner allowing free vertical movement on the elevating cylinder 77 mounted on the second carriage 37. The piston rod 77P is connected to the movable vise body 41.

Accordingly, the movable vise body 41 is moved vertically with respect to the second carriage 37 by the operation of the elevating cylinder 77.

Because the movable vise body 41 can be moved in this manner, it is capable of easily accommodating a large diameter workpiece WP. In addition, the clamp jaws 39A, 39B can easily pass above the cut section WP and return to the original center position after they have conveyed the cut section WP in the lateral direction from the conveyor route means 27. Moreover, when the movable vise body 41 returns to its original position on the conveyor route means 27, the next cut section WP can be clamped by descending the movable vise body 41 while the cut section WP being positioned between the two clamp jaws 39A, 39B, even when the next cut section WP has been placed on the conveyor route 27.

The first and second clamp jaws 39A, 39B provided on the movable vise body 41, project in the rear direction as shown in FIG. 3 (in the right direction in FIG. 3) to clamp the cut section WP at the cutting position on the cutting machine 1. Also, to clamp the cut section WP at the cutting position, the first clamp jaw 39A is mounted on the movable vise body 41 so that it can be positioned at a standard position aligned with the fixed vise jaw 7F on the cutting machine 1 when the second carriage 37 is positioned at the center position in the lateral direction.

In addition, a small cylinder 42 (see FIG. 2) provided with a reciprocating piston (not shown) with a short stroke is mounted on the movable vise body 41, and the piston of the small cylinder 42 is connected to the first clamp jaw 39A. Accordingly, the first clamp jaw 39A can be slightly moved from the standard position toward the side by the action of the small cylinder 42. As a result, for example, when the clamp jaws 39A, 39B move in the longitudinal direction relative to the cut section WP, the clamp jaws 39A, 39B do not come into contact with the cut section WP.

The second clamp jaw 39B can freely move in the lateral direction toward and away from the first clamp jaw 39A. A piston rod (not shown) provided in a freely reciprocating manner in the lateral direction on a clamp cylinder 79 mounted on the movable vise body 41 is connected to the second clamp jaw 39B.

In the abovementioned configuration, in order to clamp the workpiece W to be cut, the moving part 25 of the cut section conveyor device 3 moves toward the rear (i.e. to the right in FIG. 1), the movable vise body 41 moves vertically so that the first and second clamp jaws 39A, 39B are positioned corresponding to the height of the workpiece W, and the section WP cut from the workpiece W is clamped by the first and second clamp jaws 39A, 39B. Then, after the cutting of the workpiece W is completed, the servomotor 57 is driven and the moving part of the conveyor device 25 is moved forward to convey the cut section WP forward. When the cut section WP conveyed on the conveyor route means 27 reaches a position corresponding to the desired splitter members 31R, 31L, the conveying of the cut section WP is halted.

After the conveying of the cut section WP is halted, the second carriage 37 is moved from the center position to the left or the right by the action of the first cylinder 69 or the second cylinder 71, so that the cut section WP is suitably allocated to the left or the right splitters 31L, 31R from the conveyor route means 27. During the lateral movement of the second carriage 37, the first and second clamp jaws 39A, 39B loosely or firmly clamp the cut section WP in accordance with the shape and the weight of the cut section. When the cut section WP is circular and loosely clamped by the clamp jaws 39A, 39B, it is able to roll, so it can be easily moved in the lateral direction. Also, when the cut section WP is light and firmly clamped by the clamp jaws 39A, 39B, the cut section WP can be quickly moved laterally.

In the case where the left and right splitters 31L, 31R are constructed as an inclined rack, as shown by the fictitious line in FIG. 2, since the first and second clamp jaws 39A, 39B are positioned on the two sides of the cut section WP, roll down from the rack of the cut section is prevented and the safety conditions is improved. In addition in that case, when the cut section WP is conveyed to the side on the inclined rack, the clamp jaws 39A, 39B can be placed at a higher position than the cut section WP by slightly elevating the movable rise body 41, and the second carriage 37 can easily be returned to the lateral center position.

Thus, by this embodiment of the present invention, the section WP cut in the cutting machine is conveyed forward, and then conveyed from the conveyor route selectively to the left side or the right side.

After the second carriage 37 is returned to the lateral center position as outlined above, the first carriage 35 is moved to the rear. At this time, the first clamp jaw 39A is moved slightly to the side from the standard position by the action of the small cylinder 42. Therefore it can be moved to the clamping position without contacting the workpiece W.

Next, the front end of the workpiece W at the cutting position is clamped by the first and second clamp jaws 39A, 39B. After the main vise device 7 unclamps the workpiece W in the cutting position, the workpiece W can be moved forward by moving the first carriage 35 forward.

The amount that the position of the first carriage 35 has advanced from the position where the front end of the workpiece W is clamped by the clamp jaws 39A, 39B can be detected by counting the number of pulses output from the pulse encoder 61.

Accordingly, the cut section conveyor device 3, can be used for feeding the workpiece W to the cutting machine 1 and for determining the cut length of the workpiece W, as well as being used to convey the cut section WP forward from the cutting position of the cutting machine 1.

Figure 6:
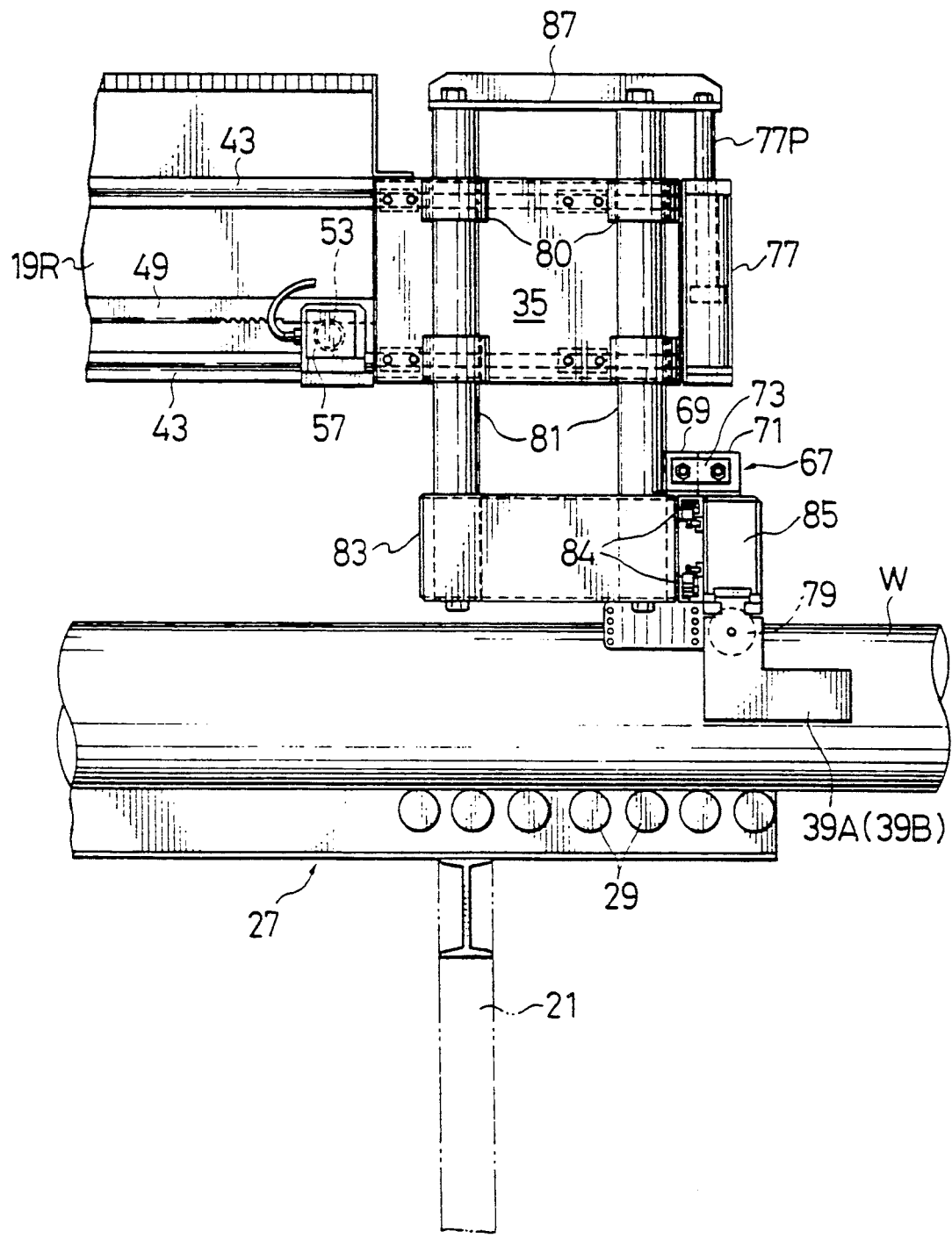
FIG. 6 is a side elevational view showing a second embodiment of the present invention and corresponds to FIG. 3 showing the first embodiment.

A second embodiment of the present invention is illustrated in FIG. 6. In this embodiment the guide rail 43 is provided at both the top and the bottom of each of the beam members 19R, 19L (one side only shown), and the rack 49 is provided between the upper and lower guide rails 43. The pinion 53 provided on the servomotor 57 mounted on the first carriage 35—which is freely movable forward and backward, guided on the guide rails 43—engages the rack 49.

The configuration of the second embodiment differs from that of the first embodiment in the following respects.

Specifically, in the second embodiment, a plurality of elevating rods 81 is supported in a manner allowing free vertical motion on the first carriage 35 through a plurality of guide members 80, and a second carriage 83 is mounted at the bottom of the elevating rods 81. A movable vise body 85 provided with the clamp jaws 39A, 39B is supported in a manner allowing free lateral motion on the second carriage 83 through a guide member 84.

Further, in the second embodiment, the elevating cylinder 77 is mounted on the first carriage 35 to move the second carriage 83 vertically through the elevating rods 81. That is to say, the piston rod 77P of the elevating cylinder 77 is connected to a connecting member 87 which is linked to the upper end of the elevating rods 81.

The reciprocating movement device 67 is provided between the second carriage 83 and the movable vise body 85 to reciprocatingly move the movable vise body 85 in the lateral direction on the second carriage 83.

Accordingly, in the second embodiment, the second carriage 83 is moved vertically with respect to the first carriage 35, and the movable vise body 85 is moved laterally relative to the second carriage 83. Other than these points the configuration and operation of the second embodiment are the same as the first embodiment, therefore the same reference numbers are used for members with identical functions, and a more detailed explanation of the configuration and operation is omitted.

FIG. 7 to FIG. 13 show examples of various modifications of the connections of the first and second cylinders 69, 71 on the reciprocating movement device 67 for moving the movable vise body 85 to the lateral center position and to the left and right sides of the second carriage 83 of the second embodiment.

In FIG. 7 to FIG. 13, the movable vise bodies 85 are positioned in the center position. Here, when the first and second cylinders 69, 71 are both at the end of their strokes, the movable vise body 85 is positioned at the lateral center, and when the movable vise body 85 is positioned in the center, the first clamp jaw 39A is positioned at the standard position with respect to the fixed vise jaw 7F of the main vise device 7 of the cutting machine 1.

Figure 7:
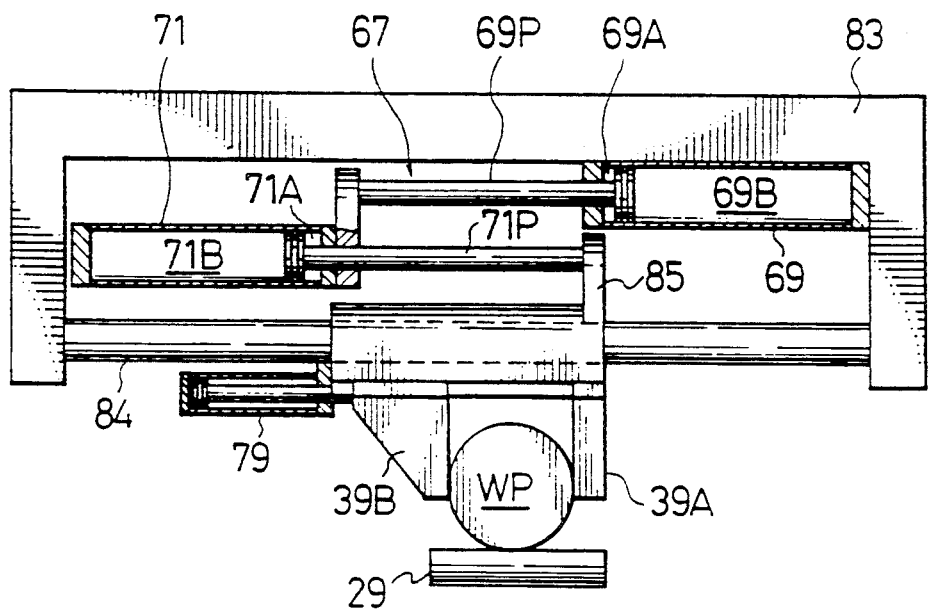
FIGS. 7, 8, 9, 10, 11, 12, and 13 are explanatory drawings showing examples of various modifications of the cylinder connection of the second embodiment.

In the modification shown in FIG. 7, the piston rod 69P of the first cylinder 69 provided on the second carriage 83 is connected to the second cylinder 71, and the piston rod 71P of the second cylinder 71 is connected to the movable vise body 85. In this configuration the piston rod 69P of the first cylinder 69 and the piston rod 71P of the second cylinder 71 project in mutually opposed directions. Thus, by maintaining both the piston rods 69P and 71P in the projecting state, the movable vise body 85 can be maintained in the lateral center position.

Figure 8:
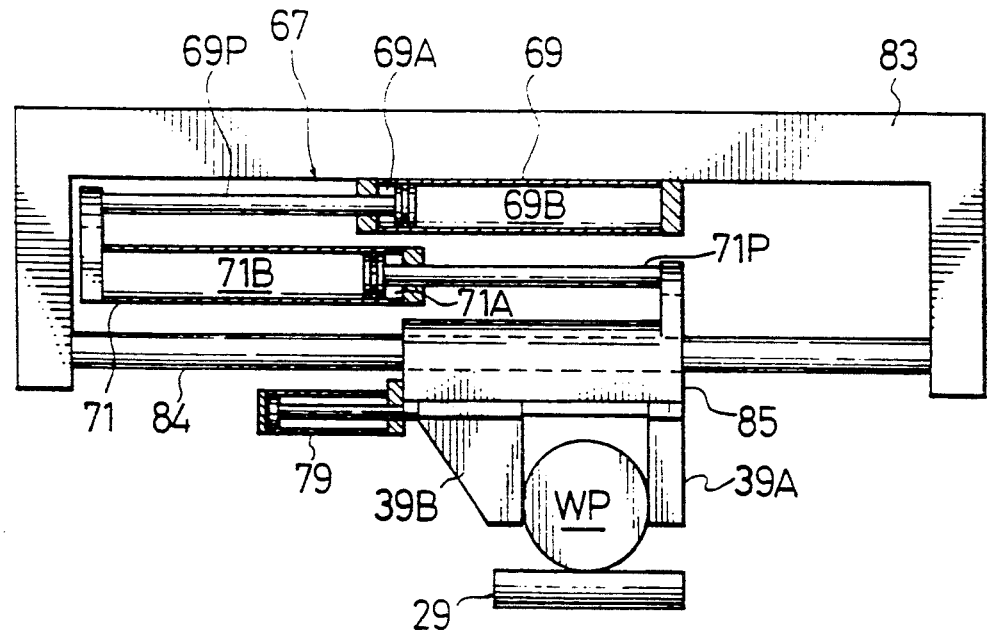

FIG. 8 shows a modification of the configuration shown in FIG. 7. The mounted position of the first cylinder 69 with respect to the second carriage 83, and the connecting position of the piston rod 69P of the first cylinder 69 and the second cylinder 71 are changed.

Figure 9:
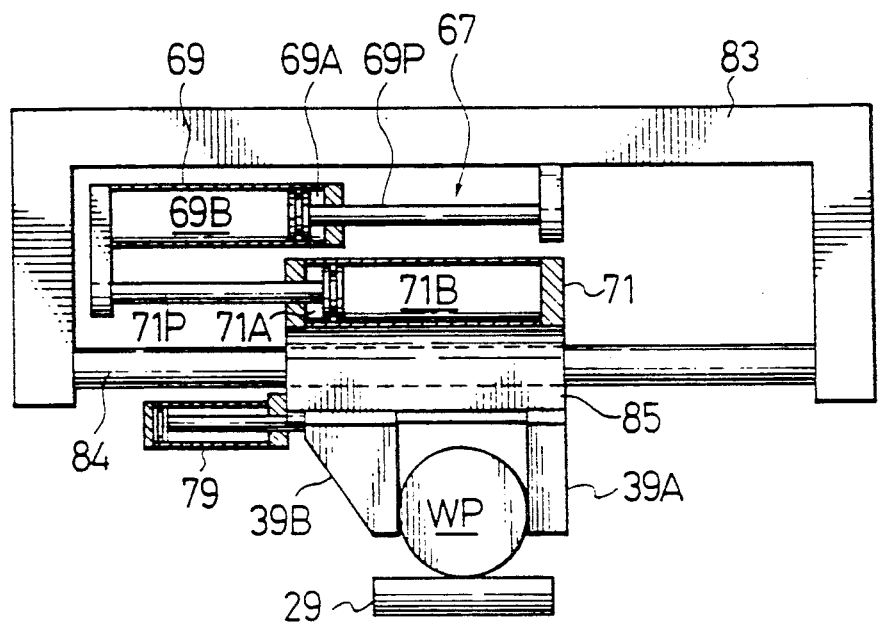

In FIG. 9 the connections of the piston rods 69P and 71P of the first cylinder 69 and the second cylinder 71 are the reverse of those in the modification shown in FIG. 8.

Figure 10:
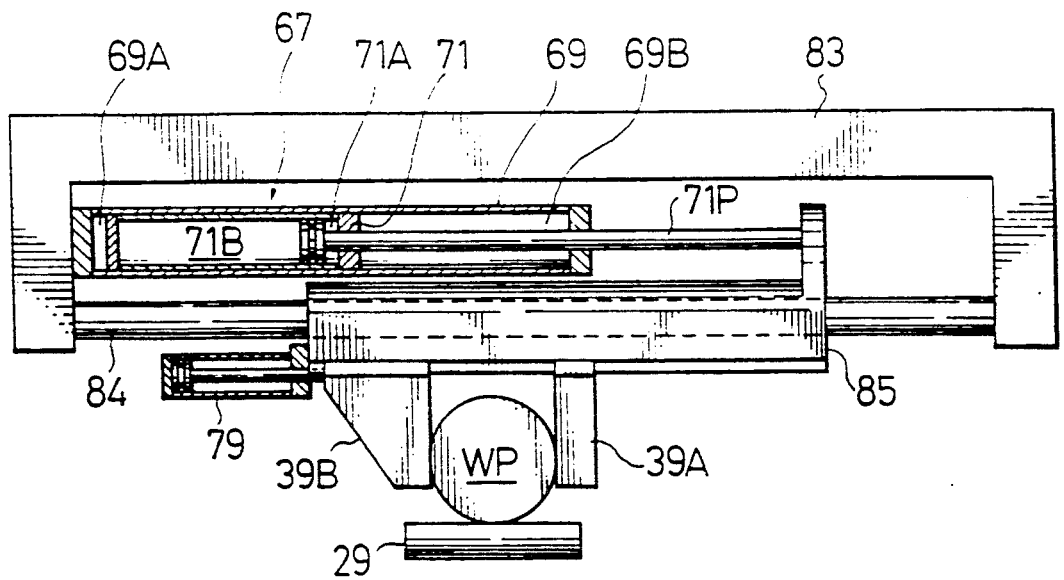

In FIG. 10 the second cylinder 71 is inserted in a freely sliding manner into the first cylinder 69. The cylinder rod 71P of the second cylinder 71 projects from the first cylinder 69 and is connected to the movable vise body 85.

Figure 11:
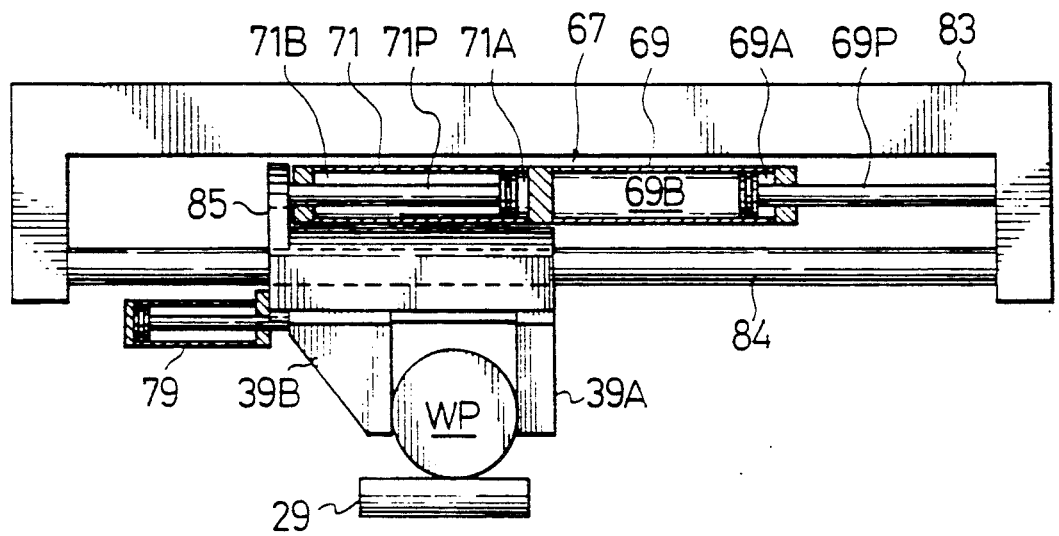

In FIG. 11 the base sections of the first cylinder 69 and the second cylinder 71 are directly connected.

Figure 12:
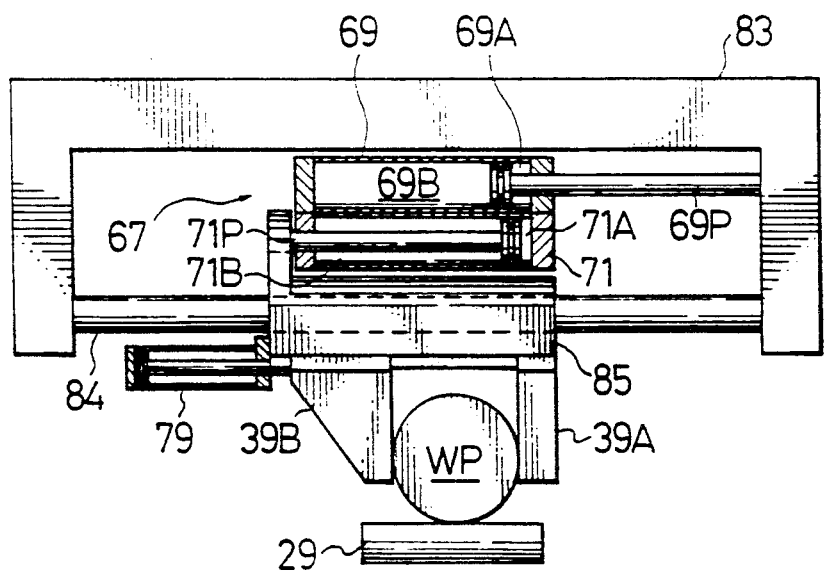

FIG. 12 shows a configuration in which the first cylinder 69 and the second cylinder 71 are arranged in parallel but face in opposite directions.

Figure 13:
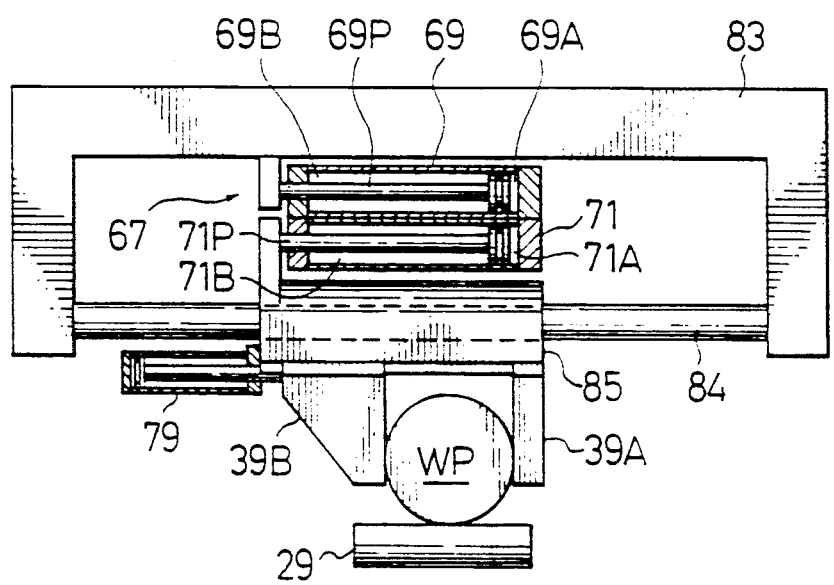

FIG. 13 shows a configuration in which the first cylinder 69 and the second cylinder 71 are arranged in parallel and extend in the same direction.

In the modifications shown in FIG. 7 to FIG. 13, by supplying the operating fluid to the hydraulic chamber 69A of the first cylinder 69 and discharging the fluid from the hydraulic chamber 69B, the movable vise body 85 is moved to the right in all drawings. Also, by supplying the operating fluid to the hydraulic chamber 71A of the first cylinder 71 and discharging the fluid from the hydraulic chamber 71B, the movable vise body 85 is moved to the left.

Further, the configuration by which the movable vise body 85 is reciprocatingly moved laterally is not limited to the abovementioned embodiments. For example, a configuration in which a ball screw or the like is used, or a configuration in which an endless chain is provided, connected to the movable vise body, can also be used.

In a screw feed mechanism using the ball screw, a first screw feed device mounted on the second carriage 83 may support a second screw feed device so as to be movable in the lateral direction. The movable vise body 85 may be supported on the second screw feed device free to move in the lateral direction.

Figure 14:
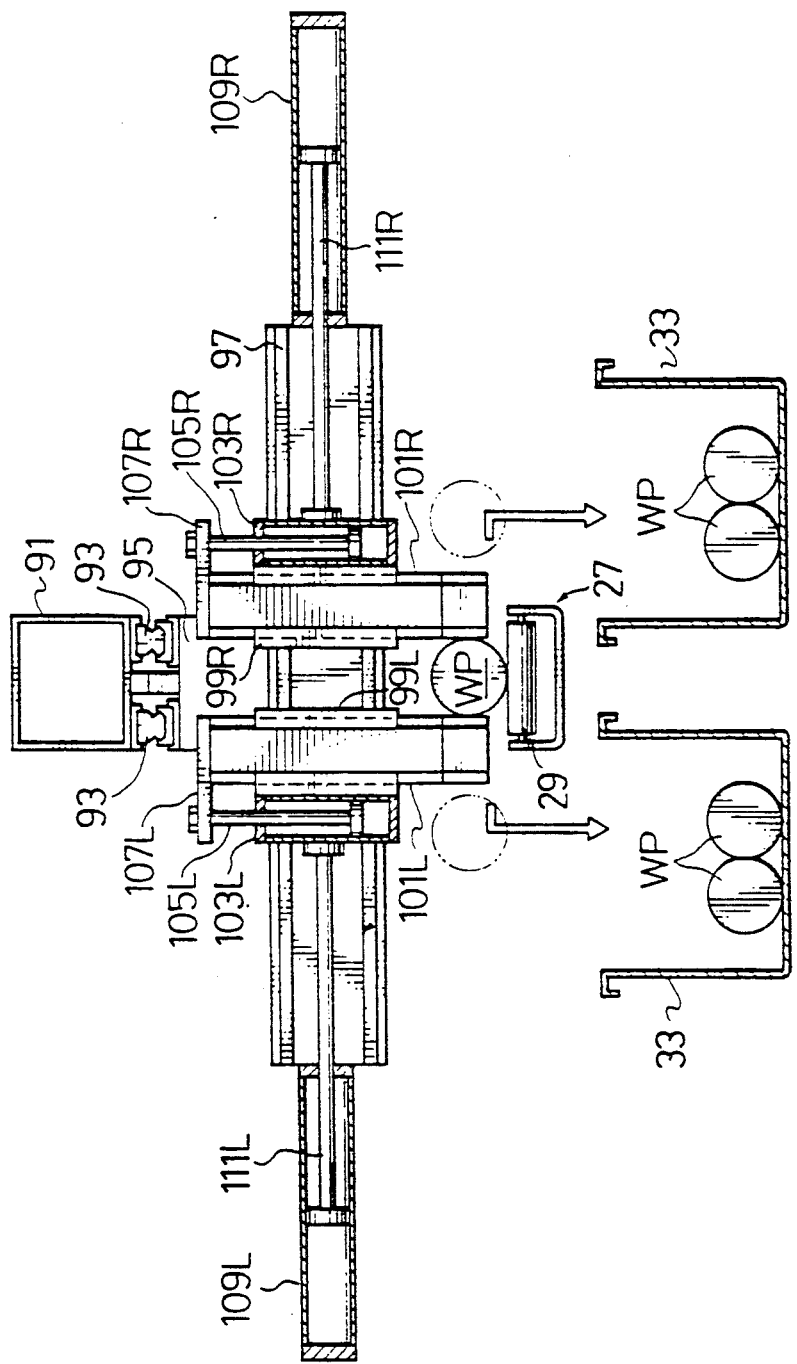
FIG. 14 shows a third embodiment of the present invention, and is an explanatory drawing showing the main parts only as a front elevation corresponding to FIG. 2 showing the first embodiment.

FIG. 14 shows a third embodiment of the present invention. In this embodiment a first carriage 95 is supported in a manner allowing free longitudinal movement (movement at right angles to the surface of the paper in FIG. 14) on a longitudinal guide member 93 provided on beam member 91 extending in the longitudinal direction. A laterally extending section 97 is provided on the first carriage 95. A pair of symmetrical left and right second carriages 99R, 99L are provided, movable in the left and right directions respectively on the laterally extended section 97. A pair of clamp jaws 101R, 101L are provided in a manner allowing free vertical movement on the second carriages 99R and 99L respectively.

Elevating cylinders 103R and 103L are mounted on the second carriages 99R and 99L respectively to provide vertical movement for the clamp jaws 101R, 101L. A pair of piston rods 105R, 105L provided on the elevating cylinders 103R, 103L respectively are connected to the clamp jaws 101R, 101L through a pair of respective connecting members 107R, 107L. A right operating cylinder 109R and a left operating cylinder 109L are mounted, one on each side of the laterally extended section 97, to move the second carriages 99R and 99L in the right and left directions respectively. A pair of piston rods 111R, 111L for the right and left operating cylinders 109R, 109L respectively are connected to the second carriages 99R and 99L.

In this configuration, when one of the clamp jaws 101R, 101L is upwardly disengaged or when the cut section WP is clamped by the right and left clamp jaws 101R, 101L, the second carriages 99R and 99L can be moved in the lateral direction individually or together. Thus, the cut section WP can be easily conveyed from the conveyor route means 27 to either the left or the right, optionally.

In this embodiment, the right and left clamp jaws 101R, 101L can be raised or lowered individually, therefore the one clamp jaw 101R, for example, can be lowered while the other clamp jaw 101L can be suitably raised. Therefore the cut section WP can be clamped with the right and left clamp jaws 101R, 101L at different heights. Accordingly, the workpiece is not limited to having a circular or rectangular cross section. That is to say, workpieces of many different cross sectional shapes can be accommodated.

The configuration where the clamp jaws 101R, 101L are upwardly disengaged is not limited to straight upward movement, as in this embodiment. For examples, the clamp jaws 101R, 101L may swing to direct in the horizontal direction.

Figure 15:
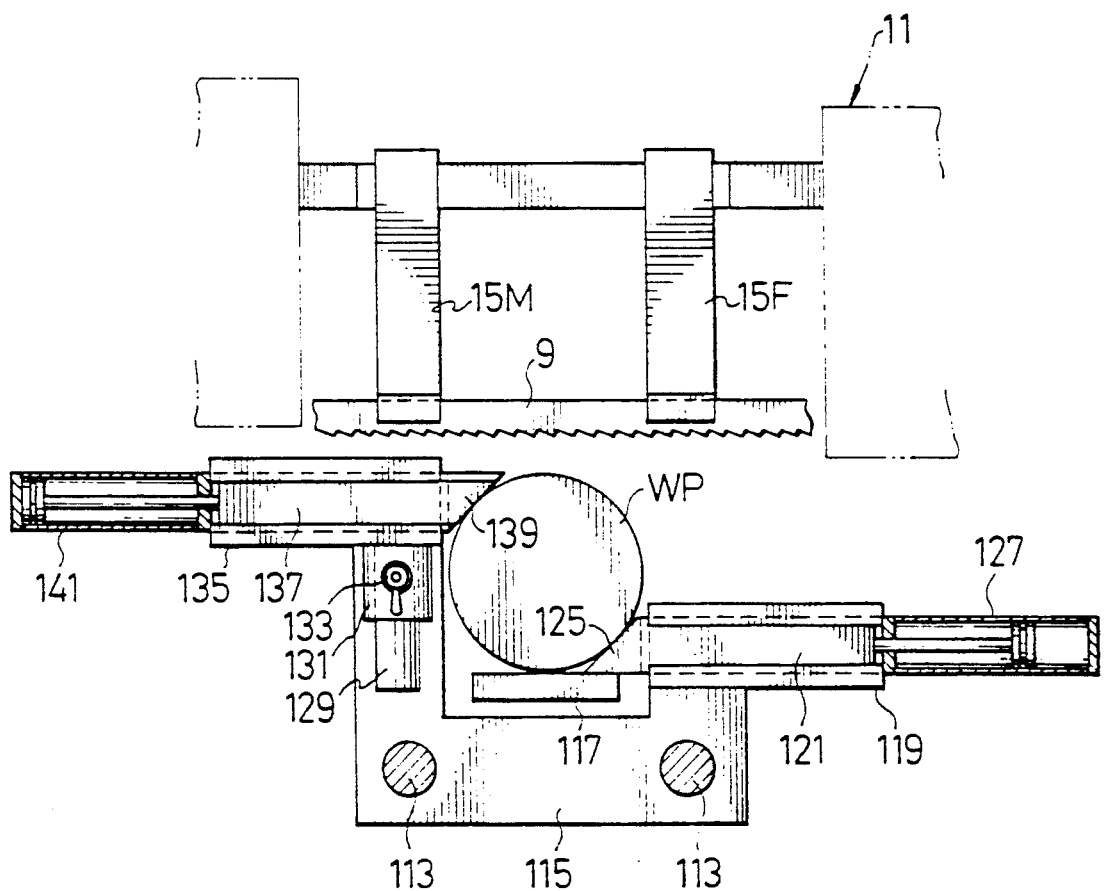
FIG. 15 is a front elevational view of a fourth embodiment of the present invention, showing the main parts only.
Figure 16:
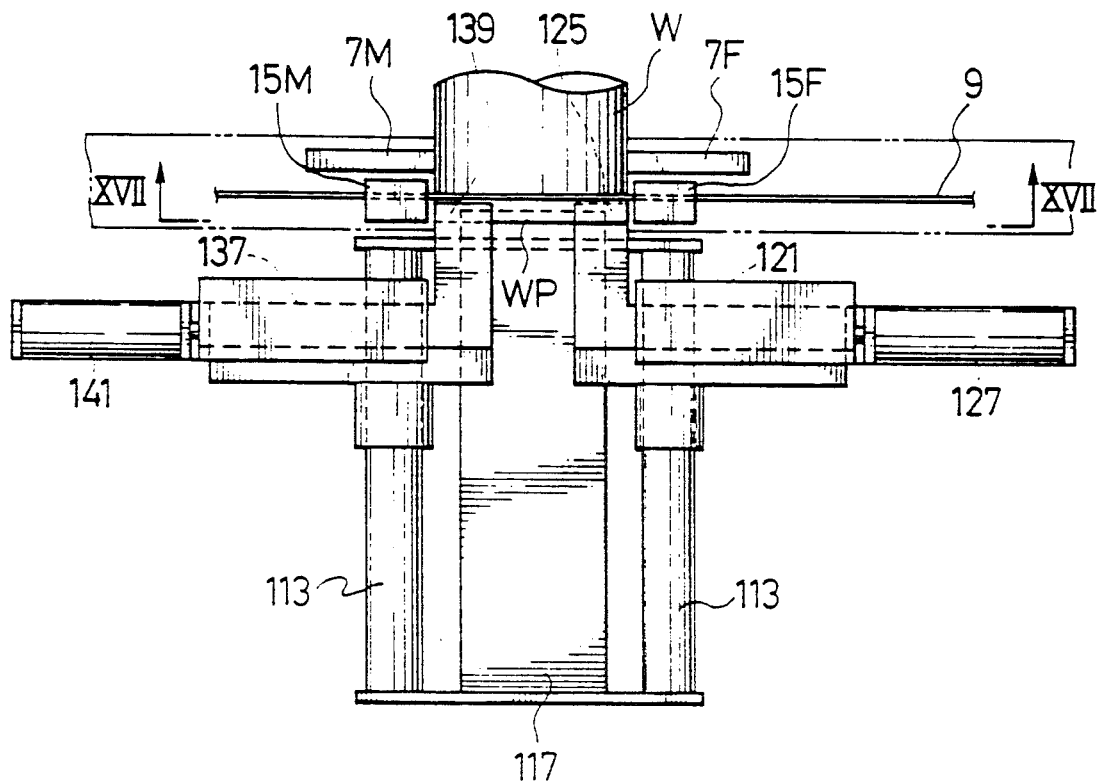
FIG. 16 is a plan view of the embodiment of FIG. 15.

FIG. 15 and FIG. 16 show still another embodiment of the present invention. In this embodiment, the cut section WP can be securely clamped even when a short section WP is cut from the workpiece at the cutting position of the cutting machine 1 and the saw blade guides 15F, 15M are placed extremely close to the workpiece W.

Specifically, in this embodiment, a movable vise body 115 on a longitudinal guide bar 113 provided on the conveyor frame at the front of the cutting machine 1 is supported in a manner allowing free longitudinal movement. The movable vise body 115 is provided with a fixed vise guide 119 at the side corresponding to the fixed vise jaw 7F of the main vise deice 7 on the cutting machine 1, at almost the same height as a support table 117 which supports the workpiece W. A lower clamp jaw 125 which clamps the bottom side of the workpiece W, is installed on a jaw holder 121 supported in a manner allowing free lateral sliding on the fixed vise guide 119. The lower clamp jaw 125, which has an almost square cross section, extends to the cutting position side of the cutting machine 1 and penetrates a space 123 which is enclosed by the circular workpiece W, the support table 117, and a perpendicular surface VF, having triangular shape in cross-section (see FIG. 17). In addition, a clamp cylinder 127 which moves the jaw holder 121 is mounted on the fixed vise guide 119.

A vertical guide 129 is provided on the side of movable vise body 115 which side corresponds to the side of the movable vise jaw 7M of the main vise body 7, and a vertical slider 131 is mounted with free positional adjustability on the vertical guide 129. Specifically, the vertical slider 131 is secured at an optional height on the vertical guide 129 by a securing tool 133 such as, for example, a lock screw or the like.

A movable vise guide 135 which is symmetrical with respect to the fixed vise guide 119 are installed on the vertical slider 131. A jaw holder 137 is supported on the movable vise guide 135 in a freely laterally sliding manner. An upper clamp jaw 139 for clamping a section of the workpiece W opposite to the section of the workpiece where the lower clamp jaw 125 clampes the workpiece, is provided on the jaw holder 137. In addition, a clamp cylinder 141 which moves the jaw holder 137 is mounted on the movable vise guide 135.

Figure 17:
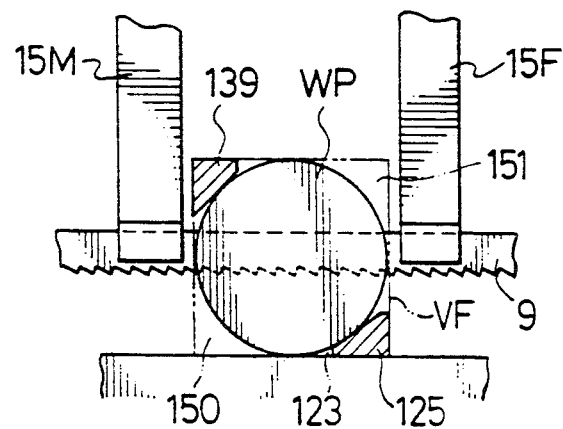
FIG. 17 is a sectional view taken along the lines XVII—XVII in FIG. 16.

With this configuration, the vertical slider 131 can be adjusted vertically to correspond to the diameter of the workpiece W, and, when the workpiece W is cut at the cutting position, the cut section WP can be securely clamped by the upper and lower clamp jaws 125, 139 positioned as shown in FIG. 17, even when the section WP cut from the workpiece W is very short and the saw blade guides 15F, 15M are set extremely close to the cutting machine 1.

As shown in FIG. 17, both the clamp jaws 125, 139 have an almost triangular cross section so that, when the cut section WP is clamped in the clamp jaws 125, 139 from the pressure applied by the clamp cylinders 127, 141, the component of the force in the axial direction of the cut section WP is used to reliably clamp the cut section WP.

In this embodiment, the case is shown where one pair of clamp jaws 125, 139 are provided. However, it is also possible to have a configuration in which the cut section WP is clamped on four sides by providing another pair of clamp jaws which penetrate the regions 150, 151 shown in FIG. 17.

Figure 18:
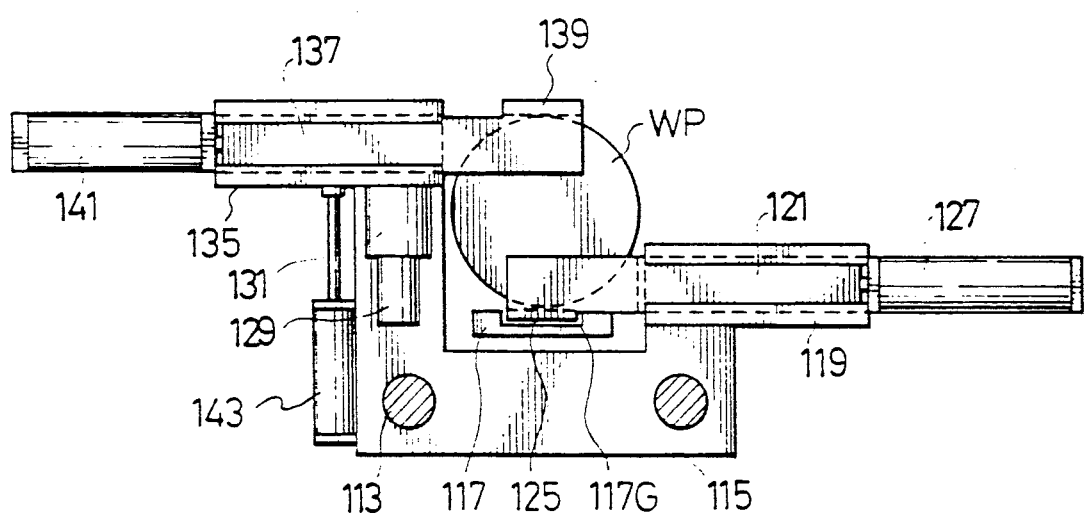
FIG. 18 is an explanatory drawing showing examples of modifications to the embodiment shown in FIG. 15.

FIG. 18 shows yet another embodiment of the present invention. In this embodiment, a longitudinal channel 117G is formed in the center section of the upper surface of the support table 117. The lower clamp jaw 125 is positioned in the channel 117G and supports the lower part of the cut section WP. The movable vise guide 135 is moved vertically by an elevating cylinder 143, and the upper clamp jaw 139 applies downward pressure to the top part of the cut section WP. The balance of the structure is identical to the embodiment shown in FIG. 15.

By means of this embodiment, the upper and lower clamp jaws 139, 125 secure the cut section WP from the top and the bottom, so that the cut section WP can be easily clamped, even in the case where the saw blade guides 15F, 15M on the cutting machine 1 are set extremely close to the workpiece W.

As can be readily understood from the above explanation of these embodiments, a wide variety of types of sections cut away from the workpiece at the cutting position of the cutting machine can be conveyed forward, then transported laterally to a position at either the left or the right side of the conveyor route.

In addition, even in the case where there is concern that the clamp jaw of the conveyor device will be obstructed by the saw blade guide at the cutting position when a short section is cut from the workpiece, the cut section can be securely clamped while being held in the clamp jaws.

Although a preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A cut section conveying device for a cutting machine for conveying a section cut by a cutting machine, comprising:
    a conveyor frame provided at the front side of the cutting machine;
    a carriage supported on the conveyor frame in a freely reciprocating manner in a longitudinal direction, approaching and withdrawing relative to the cutting position of the cutting machine;
    a movable vise body, suported in a manner allowing free movement in a lateral direction perpendicular to said longitudinal direction on the carriage, the movable vise body being provided with a first clamp jaw and a second clamp jaw for clamping a section cut from a workpiece by the cutting machine and able to move in the lateral direction with the clamp jaws clamping the cut section;
    a reciprocating action device for moving the movable vise body in a reciprocating manner in the lateral direction relative to the carriage; and
    means for lifting up the clamp jaws so that the lower parts of the clamp jaws are raised to a position higher than the height of the cut section.

2. The cut section conveying device for a cutting machine of claim 1, wherein the reciprocating action device for moving the movable vise body in a reciprocating manner in the lateral direction relative to the carriage further comprises a plurality of hydraulic cylinders connected with each other in series or in parallel, and when the hydraulic cylinders are activated to the end of the stroke so that the movable vise body is positioned at the lateral center, one of the clamp jaws is positioned at a standard position.

3. The cut section conveying device for a cutting machine of claim 2, wherein the one of the clamp jaws is movable by a short lateral distance relative to the movable vise body.

4. A cut section conveying device for a cutting machine for conveying a section cut by a cutting machine, comprising:
    a conveyor frame provided at the front of the cutting machine;
    a first carriage supported on the conveyor frame in a freely reciprocating manner in a longitudinal direction, approaching and withdrawing relative to a cutting position of the cutting machine;
    a second carriage supported on the first carriage in a freely reciprocating manner in a vertical direction; and
    a movable vise body supported in a manner allowing free movement in the lateral direction perpendicular to said longitudinal direction on the second carriage, the movable vise body being provided with a first clamp jaw and a second clamp jaw for clamping the cut section.

5. A cut section conveying device for a cutting machine for conveying a section cut by a cutting machine, comprising:
    a conveyor frame provided at the front of the cutting machine;
    a carriage supported on the conveyor frame in a freely reciprocating manner in the longitudinal direction, approaching and withdrawing relative to the cutting position of the cutting machine; and
    a first and a second movable vise body provided with first and second clamp jaws for clamping the cut section and supported in a freely reciprocating manner in the lateral direction perpendicular to said longitudinal direction on the carriage.

6. The cut section conveying device for a cutting machine of claim 5, wherein the first and second clamp jaws are supported in a manner allowing free vertical movement on the first and second movable vise bodies.

7. A cut section conveying device for a cutting machine for conveying a section cut by a cutting machine, comprising:
    a longitudinal guide bar provided at the front of the cutting machine;
    a movable vise body supported on the guide bar in a freely reciprocating manner in the longitudinal direction, approaching and withdrawing relative to the cutting position of the cutting machine; and
    a pair of first and second clamp jaws for clamping the cut section, supported on the movable vise body;
    wherein at least one of the first and second clamp jaws is freely insertable into a space between a support table, which supports the cut section, and the cut section.

8. The cut section conveying device for a cutting machine of claim 7, wherein at least one of the first and second clamp jaws has free positional adjustability in the vertical direction corresponding to the diameter of the cut section.

* * * * *